Dec. 5, 1933.  R. S. JOHNSTON  1,937,574
COATED WELDING ELECTRODE
Filed April 6, 1933
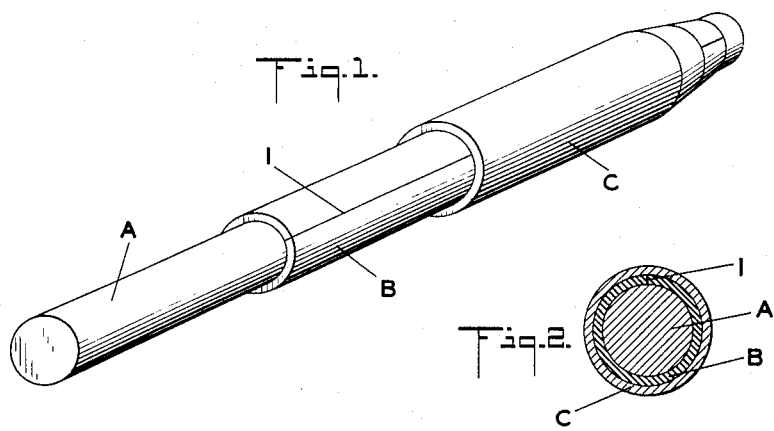
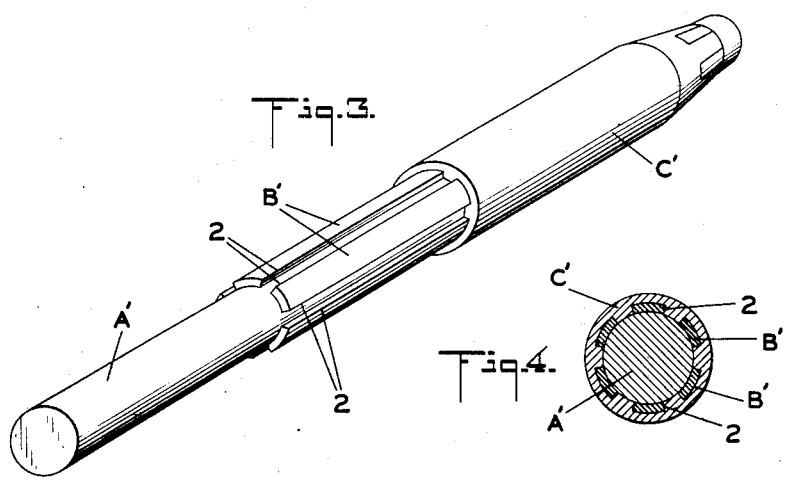

Patented Dec. 5, 1933

1,937,574

UNITED STATES PATENT OFFICE 1,937,574

COATED WELDING ELECTRODE

Robert S. Johnston, Yardley, Pa., assignor to John A. Roebling's Sons Company, Trenton, N. J., a corporation of New Jersey Application April 6, 1933. Serial No. 664,710

13 Claims. (Cl. 219—8)

This invention relates to coated welding electrodes.

It has been common in the art heretofore to provide a coated welding rod having a metal core, asbestos strips or cord wound directly on the core, and an outer layer of coating composition in direct contact with the asbestos layer, this coating composition being in plastic condition when placed upon the asbestos layer and being thereafter hardened by drying. The asbestos layer has heretofore been employed chiefly to provide a surface to which the coating composition will cling better than it would to the surface of the metal core and also because of its high thermal and electrical insulating properties.

With such coated welding electrodes there have been some difficulties in use, such as, for example, the formation of a crystalline deposit of weld metal with consequent loss of strength, and a failure of the molten metal to unite as a homogenous mass, perhaps due to occlusion of slag in the molten metal and to the formation of a heavy or viscous slag, which not only does not float out of the molten metal as it should, but, when cold, forms a hard material which is difficult to remove from the weld.

It is the object of the present invention to produce a coated welding electrode which will utilize the advantages of the asbestos sheath but at the same time will be free from the disadvantages of such electrodes as heretofore employed.

With this object in view, the invention consists in a welding electrode in which the metal core rod is of steel with a high degree of purity and uniformity, a layer of asbestos paper directly on the surface of the rod, the margins of the paper in all cases being arranged parallel to the longitudinal axis of the rod, the cross-sectional area of the asbestos paper being symmetrically arranged about the central longitudinal axis of the rod and of as nearly uniform thickness at all points as can be obtained in practice, and an outer layer of coating composition enclosing and contacting with the asbestos layer, the components of the said coating composition and its thickness being such as to allow for the chemical reaction of certain ingredients of the asbestos, particularly the magnesium silicate, and produce a very fluid slag which when cooled will form a blebby glass-like coating, the said composition also being such that it will form an acid slag high in silica which will overcome the disadvantage due to the fact that the metal of the rod, because it is low in silicon, would tend to produce a thick, somewhat sluggish, molten metal easily affected by the nitrogen and oxygen of the air.

The invention consists further in so proportioning the amount of asbestos to the amount of outer coating composition and to the rod that the desired slag will be formed as a result of the reaction of the asbestos and the outer coating composition when both are acted upon by the heat of the arc.

The invention will be more particularly pointed out in connection with the accompanying drawing in which,—

Fig. 1 is an elevation, partly broken away, or a welding rod embodying one form of the invention;

Fig. 2, a diagrammatic cross-section of the welding rod shown in Fig. 1,

Fig. 3, a view similar to Fig. 1, illustrating another embodiment of the invention, and Fig. 4, a diagrammatic cross-section of the rod shown in Fig. 3.

It has been found by applicant that if there is too small a percentage of asbestos, as compared with the outer coating composition and the metal of the core rod, the deposited weld metal when cold is quite crystalline, as shown by fracturing it, and contains a large percentage of small gas holes, whereas with an electrode made in accordance with the invention the metal shows a silky or fibrous fracture and to a very marked extent the small gas pockets are eliminated from the iron.

Applicant has found that the thickness of the external coating composition has a marked effect on the quality of the weld. If the said coating is too thin, not enough slag is made available to completely encase the weld bead and this makes for a rather irregular laying down of the weld bead. On the other hand, if there is too much slag, as a result of too thick an external coating, the slag will be likely to overrun the arc and thereby interfere with regular welding procedure.

Therefore, it is an essential feature of the present invention that the proportion of coating composition relative to the metal in the rod be kept within predetermined limits, and, on account of the chemical effects of certain ingredients of the asbestos, the proportion of the asbestos paper must also be kept within predetermined limits relative to the composition and hence relative to the metal of the rod, but as discovered by applicant the proportion must vary with the size of the rod. Since the diameters of the metal rods are generally stated in thirty-seconds of an inch, a simple empirical formula for the thickness of the coating composition is as follows:

$$T = 0.004\,(64r - \tfrac{1}{2})$$

In this formula T is the thickness of the coating composition and $r$ is the radius of the metal rod, stated in sixty-fourths of an inch. This formula assumes that the thickness of the coating composition is uniform at all points. In practice, of course, such perfection cannot be obtained and, therefore, a certain variation in thickness must be allowed for. It has been found that the allowable variation must not exceed 15 percent, plus or minus, of the thickness determined by the above formula.

A layer of coating composition dimensioned within the above stated limits will form sufficient slag to properly protect the molten metal and yet not be so great as to interfere with the action of the arc.

The thickness of the asbestos paper wrapping is in accordance with the following formula:

$$t = 0.0012\,(64r + 4\tfrac{1}{2})$$

In this formula, $t$ is the thickness of the asbestos paper layer, and, as before, $r$ is the radius of the metal rod. While this formula gives the desired thickness for the asbestos paper layer, it is not possible in practice to obtain paper of such uniformity as to comply exactly with the formula and for this reason variations are bound to occur. The variation of the thickness should be kept within 13 percent, plus or minus, of the calculated thickness. This is particularly so for the smallest sizes of welding rods because it is difficult to obtain a good, substantially uniform asbestos paper less than 0.010 inches in thickness.

For example, the smallest size of rod generally used for a welding electrode has a diameter of three thirty-seconds of an inch, the radius, of course, being three sixty-fourths of an inch. The thickness of the asbestos layer as calculated by the formula would be .009. Since it is usually not possible to obtain an asbestos paper so thin as this, it will be necessary either to use a layer of .01 thickness, which is slightly more than 11 percent greater than the calculated thickness and hence within the limit of range hereinbefore set forth, or to put the asbestos paper on the rod in separated strips. Of course, the important relationship is the relative cross-sectional areas of the metal rod, the coating composition, and the asbestos paper, but these relationships of the area are determined by the corresponding thicknesses as given by the formulæ, including the permissible variations.

All of these statements as to thickness are based on the assumption that the asbestos paper is put on as a single layer forming a complete cylindrical sheath. Where the asbestos paper employed is too thick for the above purposes it may be put on in strips, as hereinafter explained, in which case the thickness is different, of course, but the cross-sectional area is to be the same as heretofore pointed out.

Applicant has found further that with an asbestos paper of the proper thickness and composition, it is important that the distribution of the same about the center of the rod be symmetrical and that the joint or any joints or side margins of the paper be arranged truly longitudinal, that is to say, parallel to the axis of the welding rod. If the margin of the paper be at an incline to the axis of the rod, there is likely to be a rotation of the arc as the rod is melted down, this rotation being very objectionable as it makes it difficult for the operator to control the point of deposit of the molten metal.

Furthermore, unless the asbestos is placed on the rod symmetrically about the central axis of the rod the arc will fluctuate laterally. In other words, if there is a greater thickness of asbestos at one side of the rod than at another part near the arc, the arc will swing away from the part having the thickest portion of asbestos. For this reason, the asbestos paper is put on the rod as a cylindrical jacket of uniform thickness, with no lapping at the joint, and with said joint in a line parallel to the central longitudinal axis of the metal rod, or when the asbestos paper is thicker and, if formed as a full cylindrical jacket, would supply too much asbestos, the asbestos paper is put on the rod as a series of longitudinal strips of uniform width, spaced apart uniformly, the spaces, however, being less than the width of the strips. This again gives a uniform distribution of the asbestos paper symmetrically about the central longitudinal axis of the metal rod.

In Figs. 1 and 2 is illustrated a coated welding rod A having asbestos paper B forming a closed cylinder, the edges of the paper meeting and abutting each other but not lapping. The joint of the meeting edges is indicated at 1 and is parallel to the central longitudinal axis of the metal rod A, as shown in Fig. 1. The coating layer is indicated at C.

In Figs. 3 and 4 is illustrated a modified form of the invention, particularly suitable when the asbestos paper is thicker than can be used as a complete cylinder. In this case, in order to keep down the proportion of asbestos relative to the metal rod $A^1$ and the coating layer $C^1$, a less total width of asbestos paper is employed, by using longitudinal strips, $B^1$, which are secured to the rods with their longitudinal margins 2, parallel to the central longitudinal axis of the metal rod, as indicated in Fig. 3.

The strips $B^1$ are intended to be of uniform width, or as near thereto as can be obtained in practice, and they are spaced apart a substantially equal distance, measured circumferentially of the metal rod, at any cross-sectional plane. The width of the space is less than the width of the strip of asbestos paper, and in practice it is desirable to have this space as small as the thickness of the asbestos paper will permit.

It is important that the composition of the coating, including the proportions of its constituents, be correlated to the composition of the asbestos and the proportions of such of its constituents as enter the molten slag, and this result is obtained by the selection of the ingredients for the coating composition as well as the relative cross-sectional areas of the metal rod, the asbestos paper and the coating composition, hereinbefore pointed out.

The external coating composition is particularly high in silica, in order to obtain a molten slag of an acid nature which will protect the weld metal against the oxygen and nitrogen of the air, and this is particularly important as it permits the use of a steel rod of a high degree of purity and uniformity, which metal, of course, contains carbon and is low in silicon. On account of the low silicon content the rod tends to produce a thick, somewhat sluggish, molten metal particularly subject to oxidation and the formation of nitrides, however, the use of a relatively high proportion of silica in the coating composition would result in a heavy viscous slag. To overcome this disadvantage, while retaining the advantage of the high silica content, the invention includes the use of a special flux free from alkali metal compounds, and consisting of a relatively high proportion of titanium dioxide mixed with some calcium oxide, in such proportions relative to each other and to the silica that, together with the reacting ingredients of the asbestos, the resultant slag, though high in silica, is very fluid and relatively light so that it will quickly and completely cover and protect each bead of molten weld metal as soon as it is formed and while being deposited, and will thereafter float out from the molten metal as it accumulates at the weld, thus allowing the molten metal to cohere free of slag, the latter accumulating on the outside of the mass of molten metal and protecting the same against the action of the air until it has cooled below any temperature at which the metal will react with the atmosphere.

Owing to the conjoint action of the reactive ingredients of the asbestos and the exterior coating composition, the slag when cold is of the nature of a blebby glass, so that it is easily shattered and removed from the weld as, for example, by striking it a few blows with a hammer.

In the best embodiment of the invention the essential ingredients and their proportions are as follows:

| | Percent |
|---|---|
| Silica | 48 |
| Iron oxides | 10 |
| Manganese dioxide | 6 |
| Calcium oxide | 23 |
| Titanium dioxide | 13 |

Some modification of the above proportions may be made without serious injury to the coating composition but the variation from the above figures should be within the ranges shown in the following table:

| | Percent |
|---|---|
| Silica | 46 to 56 |
| Iron oxides | 5 to 20 |
| Manganese dioxide | 5 to 15 |
| Calcium oxide | 20 to 30 |
| Titanium dioxide | 5 to 15 |

In preparing the above composition, the ingredients should be crushed and ground very finely, either each ingredient separately or all together, and it is important that all the materials shall pass a screen of 200 mesh. This result can be obtained by doing the final grinding of the mixture in a so-called colloidal mill. The importance of this is that the mixture includes crystalline materials which contain what is designated as water of crystallization, which will be set free when the materials are heated, by the arc. Where the materials are in very fine particles the water of crystallization is evolved quietly from the respective particles and the arc is not affected disadvantageously, but where the particles are relatively large, a certain amount of crepitation, or something similar thereto, will occur with a consequent disturbance of the arc, making it unsteady and, hence, difficult to control.

When the ingredients of the coating composition have been ground and sifted if necessary to obtain the desired fineness, they are mixed with a suitable liquid binder such as sodium or potassium silicate, but preferably the former, this binder being used to the extent of about 25% of the total weight of the coating composition and binder, just enough being used to make a suitable plastic composition, it being important to keep the alkali compound in the coating composition as low as possible. The proportions of the iron and manganese compounds in the coating composition are relatively low but sufficient to produce the desired slag when used with a flux containing titanium dioxide.

It is to be noted that by having the asbestos paper symmetrically arranged about the center of the metal rod, there is less danger of fluctuation laterally of the arc, and this advantage exists independently of the proportions or ingredients of the coating composition and the resulting chemical reactions between the latter and the reactive ingredients of the asbestos. Hence, a welding electrode having the metal core coated with a single wrap of asbestos paper whose margins, that is longitudinal edges, abut against each other instead of lapping, gives a steadier arc than where several wraps of such paper are used with the consequent thickening at the joint. Where, however, the paper is put on in strips, slightly separated from each other much of the same advantage can be obtained provided the symmetrical arrangement is maintained. To do this the paper must be of a substantially uniform thickness and width, with the spaces between the respective strips uniform and small relative to the width of the paper. The arrangement of the margins of the paper, that is the side edges, parallel to the longitudinal central axis of the metal core, is very important because as applicant has found, any incline of the margins to the said axis, such as with spiral winding, tends to cause a rotation of the arc. This is true even with that form in which a single wrap is used with the margins abutting against each other.

Some advantage is obtained by tapering the external coating composition and the asbestos layer at the arc-forming end of the electrode because at starting the operator can be sure of making a good metallic contact at the desired point on the metal to be welded. The drawings, Figs. 1 and 3, illustrate such pointed or tapered ends although on an exaggerated scale, in order to make this feature clear. So, too, the relative thickness of the asbestos layer and of the external coating composition are greatly exaggerated and not to scale, in the drawing. It is to be understood that the relative proportions of these should be as stated hereinbefore in the specification.

Sometimes it is desirable to provide a small amount of metallic aluminum to be melted by the arc and enter the molten slag. With the present invention it is advantageous to place such aluminum in the form of metallic powder between the asbestos paper layer and the coating composition. For example, the metal rod may be provided with the paper cover, suitable adhesive being employed for attaching the paper to the rod, then an adhesive may be applied to the outside of the asbestos paper layer when it is in place, the aluminum powder may be sprinkled on the adhesive, and the coating composition applied over the aluminum coating, with or without intermediate drying of the adhesive of such aluminum coating.

What is claimed is:

1. A coated welding electrode consisting of a metal core, asbestos carried by said core, and a layer of coating composition enclosing said core and the asbestos, said coating composition containing at least 46% of silica and also containing a flux, the cross-sectional area of the asbestos being equal to the area of a uniformly distributed layer whose thickness is determined by the formula $t=0.0012$ $(64r+4\frac{1}{2})$; plus or minus 13 percent of $t$, the cross-sectional area of the coating composition being equal to the area of a uniformly distributed layer whose thickness is determined by the formula $T=0.004$ $(64r-\frac{1}{2})$, plus or minus 15 percent of T, in which formulæ $r$ is the radius of the metal rod in sixty-fourths of an inch; $t$ the thickness of the asbestos; and T the thickness of the coating composition.

2. A coated welding electrode consisting of a metal core, asbestos paper carried by said core and a layer of coating composition enclosing said core and the asbestos paper, said coating composition containing at least 46% of silica and also containing a flux, the cross-sectional area of the asbestos paper being equal to the area of a uniformly distributed layer whose thickness is determined by the formula $t=0.0012$ $(64r+4\frac{1}{2})$; plus or minus 13 percent of $t$, the cross-sectional area of the coating composition being equal to the area of a uniformly distributed layer whose thickness is determined by the formula $T=0.004$ $(64r-\frac{1}{2})$, plus or minus 15 percent of T, in which formulæ $r$ is the radius of the metal rod in sixty-fourths of an inch; $t$ the thickness of the asbestos; and T the thickness of the coating composition.

3. A coated welding electrode consisting of a metal core, asbestos carried by said core, and a layer of coating composition enclosing said core and the asbestos, said coating composition containing at least 46% of silica and also containing a flux substantially free from alkali compounds and containing titanium oxide in an amount ranging between 5% and 15% figured on the total coating composition, the cross-sectional area of the asbestos being equal to the area of a uniformly distributed layer whose thickness is determined by the formula $t=0.0012$ $(64r+4\frac{1}{2})$; plus or minus 13 per cent of $t$, the cross-sectional area of the coating composition being equal to the area of a uniformly distributed layer whose thickness is determined by the formula $T=0.004$ $(64r-\frac{1}{2})$, plus or minus 15 percent of T, in which formulæ $r$ is the radius of the metal rod in sixty-fourths of an inch; $t$ the thickness of the asbestos; and T the thickness of the coating composition.

4. A coated welding electrode consisting of a metal core, asbestos carried by said core, and a layer of coating composition enclosing said core and the asbestos, said coating composition containing at least 46% of silica and also containing a flux, the cross-sectional area of the asbestos being equal to the area of a uniformly distributed layer whose thickness is determined by the formula $t=0.0012$ $(64r+4\frac{1}{2})$; plus or minus 13 percent of $t$, the cross-sectional area of the coating composition being equal to the area of a uniformly distributed layer whose thickness is determined by the formula $T=0.004$ $(64r-\frac{1}{2})$, plus or minus 15 percent of T, in which formulae $r$ is the radius of the metal rod in sixty-fourths of an inch; $t$ the thickness of the asbestos; and T the thickness of the coating composition.

5. A coated welding electrode consisting of a metal core, a layer of asbestos paper of uniform thickness carried by the core and having its margins parallel to the central longitudinal axis of the core, and a layer of coating composition enclosing said core and the asbestos paper, said coating composition containing at least 46% of silica and also containing a flux substantially free from alkali compounds, the cross-sectional area of the asbestos paper being equal to the area of a uniformly distributed layer whose thickness is determined by the formula $t=0.0012$ $(64r+4\frac{1}{2})$; plus or minus 13 percent of $t$, the cross-sectional area of the coating composition being equal to the area of a uniformly distributed layer whose thickness is determined by the formula $T=0.004$ $(64r-\frac{1}{2})$, plus or minus 15 percent of T, in which formulæ $r$ is the radius of the metal rod in sixty-fourths of an inch; $t$ the thickness of the asbestos; and T the thickness of the coating composition.

6. A coated welding electrode consisting of a metal core, asbestos carried by the core, and a layer of coating composition enclosing the metal core and the asbestos, said coating being formed of the following ingredients in the proportions stated:

| | Percent |
|---|---|
| Silica | 48 |
| Iron oxides | 10 |
| Manganese dioxide | 6 |
| Calcium oxide | 23 |
| Titanium dioxide | 13 |

7. A coated welding electrode consisting of a metal core, asbestos carried by the core, and a layer of coating composition enclosing the metal core and the asbestos, said coating being formed of the following ingredients in the proportions stated:

| | Percent |
|---|---|
| Silica | 46 to 56 |
| Iron oxides | 5 to 20 |
| Manganese dioxide | 5 to 15 |
| Calcium oxide | 20 to 30 |
| Titanium dioxide | 5 to 15 |

8. A coated welding rod, consisting of a metal core containing carbon, a layer of asbestos paper of uniform thickness carried by said metal core and having its margins arranged parallel to the longitudinal central axis of the metal core, and a coating composition enclosing the metal core and the asbestos paper, the cross-sectional area of the asbestos paper being equal to the area of a uniformly distributed layer whose thickness is determined by the formula $t=0.0012$ $(64r+4\frac{1}{2})$; plus or minus 13 percent of $t$, the cross-sectional area of the coating composition being equal to the area of a uniformly distributed layer whose thickness is determined by the formula $T=0.004$ $(64r-\frac{1}{2})$, plus or minus 15 percent of T, in which formulæ $r$ is the radius of the metal rod in sixty-fourths of an inch; $t$ the thickness of the asbestos paper; and T the thickness of the coating composition, the composition of the coating material being substantially as follows:

| | Per cent |
|---|---|
| Silica | 48 |
| Iron oxides | 10 |
| Manganese dioxide | 6 |
| Calcium oxide | 23 |
| Titanium dioxide | 13 |

9. A coated welding electrode consisting of a metal core, asbestos paper carried by the core, and a layer of coating composition enclosing said metal core and asbestos paper, said paper being distributed symmetrically around the central longitudinal axis of the core, the side margins of the paper being arranged parallel to the longitudinal central axis of the core.

10. A coated welding electrode consisting of a metal core, asbestos paper carried by the core, and a layer of coating composition enclosing said metal core and asbestos paper, said asbestos paper being of uniform thickness and constituting a single wrapping of uniform thickness having its side margins abutting in a line parallel to the longitudinal central axis of the core.

11. A coated welding electrode consisting of a metal core, asbestos paper carried by the core, and a layer of coating composition enclosing said metal core and asbestos paper, said paper being of uniform thickness and being arranged on the core in a plurality of uniformly distributed strips spaced apart uniformly, said strips being of equal widths and having margins separated to an extent less than the width of a strip, said margins extending lengthwise of the core and parallel to the longitudinal central axis thereof.

12. A coated welding electrode consisting of a metal core, asbestos paper carried by the core and in close contact therewith, a layer of comminuted metallic aluminum upon the asbestos paper, and a fusible coating composition enclosing the metal core, the asbestos paper and the aluminum.

13. A coated welding electrode consisting of a metal core, asbestos paper carried by the core and in close contact therewith, a layer of comminuted metallic aluminum upon the asbestos paper, and a fusible coating composition enclosing the metal core, the asbestos paper and the aluminum, the composition of the coating material being substantially as follows:

|  | Per cent |
|---|---|
| Silica | 48 |
| Iron oxides | 10 |
| Manganese dioxide | 6 |
| Calcium oxide | 23 |
| Titanium dioxide | 13 |

ROBERT S. JOHNSTON.